(12) United States Patent
Arakawa

(10) Patent No.: US 11,537,681 B2
(45) Date of Patent: Dec. 27, 2022

(54) VERIFYING STATUS OF RESOURCES LINKED TO COMMUNICATIONS AND NOTIFYING INTERESTED PARTIES OF STATUS CHANGES

(71) Applicant: FUJIFILM Business Innovation Corp., Tokyo (JP)

(72) Inventor: Takamasa Arakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 458 days.

(21) Appl. No.: 16/208,589

(22) Filed: Dec. 4, 2018

(65) Prior Publication Data
US 2019/0278823 A1    Sep. 12, 2019

(30) Foreign Application Priority Data

Mar. 12, 2018  (JP) .............................. JP2018-044194

(51) Int. Cl.
*G06F 16/955* (2019.01)
*G06F 9/54* (2006.01)

(52) U.S. Cl.
CPC .......... *G06F 16/9566* (2019.01); *G06F 9/542* (2013.01); *G06F 16/9558* (2019.01)

(58) Field of Classification Search
CPC ... G06F 9/542; G06F 16/9558; G06F 16/9566
See application file for complete search history.

(56) References Cited

U.S. PATENT DOCUMENTS

| | | | |
|---|---|---|---|
| 6,321,242 B1* | 11/2001 | Fogg .................... | H04L 29/06 715/236 |
| 6,424,966 B1* | 7/2002 | Meyerzon .............. | G06F 16/951 707/648 |
| 6,601,066 B1* | 7/2003 | Davis-Hall ........... | G06F 16/958 |
| 8,201,247 B1* | 6/2012 | Chen ..................... | G06F 21/564 726/22 |
| 8,639,806 B2* | 1/2014 | Gawor ................. | H04L 41/5074 709/224 |
| 8,661,159 B2 | 2/2014 | Nakai | |
| 9,075,777 B1* | 7/2015 | Pope ..................... | G06F 40/134 |

(Continued)

FOREIGN PATENT DOCUMENTS

| | | |
|---|---|---|
| JP | 2004078789 | 3/2004 |
| JP | 2006260343 | 9/2006 |

(Continued)

OTHER PUBLICATIONS

"Office Action of Japan Counterpart Application" with English translation thereof, dated Jan. 5, 2022, p. 1-p. 6.

*Primary Examiner* — Eric J. Bycer
(74) *Attorney, Agent, or Firm* — JCIPRNET

(57) ABSTRACT

An information processing apparatus includes an obtaining section that obtains a content; a linking section that extracts resource information indicating a resource from the content obtained by the obtaining section and links the content, a notification destination, and the extracted resource information; and a notification section that obtains a state of the resource indicated by the resource information and in a case where the obtained state satisfies a predetermined condition, transmits a notification to the notification destination linked with the resource information.

14 Claims, 10 Drawing Sheets

(56) References Cited

U.S. PATENT DOCUMENTS

| | | | | |
|---|---|---|---|---|
| 10,812,436 B2* | 10/2020 | Tokuchi | | H04L 51/224 |
| 2003/0084095 A1* | 5/2003 | Hayden | | G06F 16/9558 |
| | | | | 709/203 |
| 2003/0158953 A1* | 8/2003 | Lal | | H04L 29/06 |
| | | | | 709/230 |
| 2004/0083424 A1* | 4/2004 | Kawai | | G06F 16/958 |
| | | | | 715/205 |
| 2004/0205076 A1* | 10/2004 | Huang | | G06F 16/951 |
| 2005/0021652 A1* | 1/2005 | McCormack | | H04W 12/068 |
| | | | | 709/207 |
| 2006/0064507 A1* | 3/2006 | Tsuruoka | | H04L 51/28 |
| | | | | 709/245 |
| 2007/0300169 A1* | 12/2007 | Jones | | H04L 51/04 |
| | | | | 715/764 |
| 2008/0120533 A1* | 5/2008 | Lazier | | G06F 3/1415 |
| | | | | 715/234 |
| 2008/0133540 A1* | 6/2008 | Hubbard | | H04L 63/1483 |
| 2008/0172738 A1* | 7/2008 | Bates | | H04L 63/1483 |
| | | | | 726/22 |
| 2009/0006532 A1* | 1/2009 | Sinn | | H04L 63/1408 |
| | | | | 709/225 |
| 2009/0259693 A1* | 10/2009 | O'Sullivan | | G06F 16/27 |
| 2010/0005268 A1* | 1/2010 | Yang | | H04L 51/04 |
| | | | | 711/202 |
| 2011/0225142 A1* | 9/2011 | McDonald | | G06F 21/552 |
| | | | | 707/E17.108 |
| 2014/0282916 A1* | 9/2014 | Gast | | H04W 12/08 |
| | | | | 726/4 |
| 2015/0358397 A1* | 12/2015 | Wiseman | | H04L 67/10 |
| | | | | 709/201 |
| 2016/0036842 A1* | 2/2016 | Lee | | H04L 63/123 |
| | | | | 726/4 |
| 2016/0065600 A1* | 3/2016 | Lee | | H04L 63/1416 |
| | | | | 726/23 |
| 2016/0292207 A1* | 10/2016 | Watanabe | | G06F 40/197 |
| 2019/0372878 A1* | 12/2019 | Chakra | | H04L 67/22 |

FOREIGN PATENT DOCUMENTS

| | | |
|---|---|---|
| JP | 2006293832 | 10/2006 |
| JP | 2007323561 | 12/2007 |
| JP | 4187114 | 11/2008 |

* cited by examiner

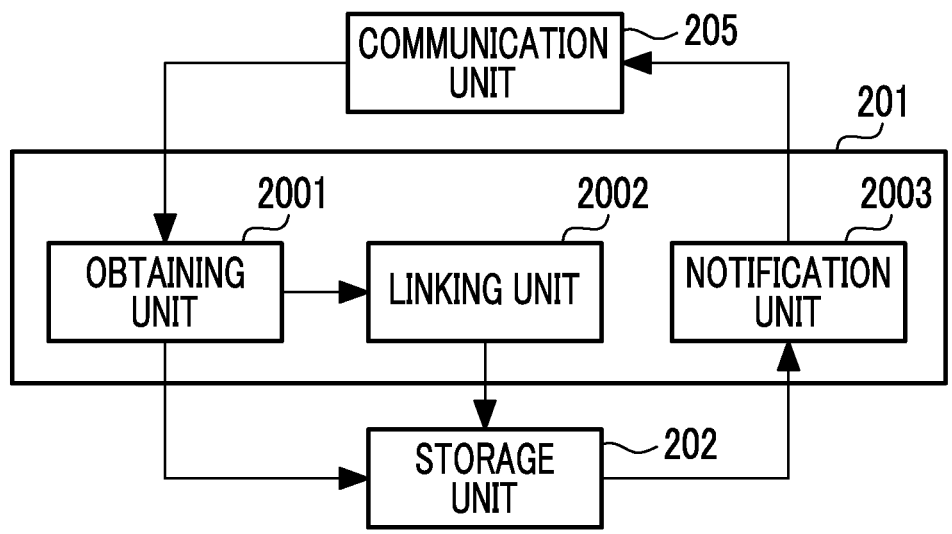

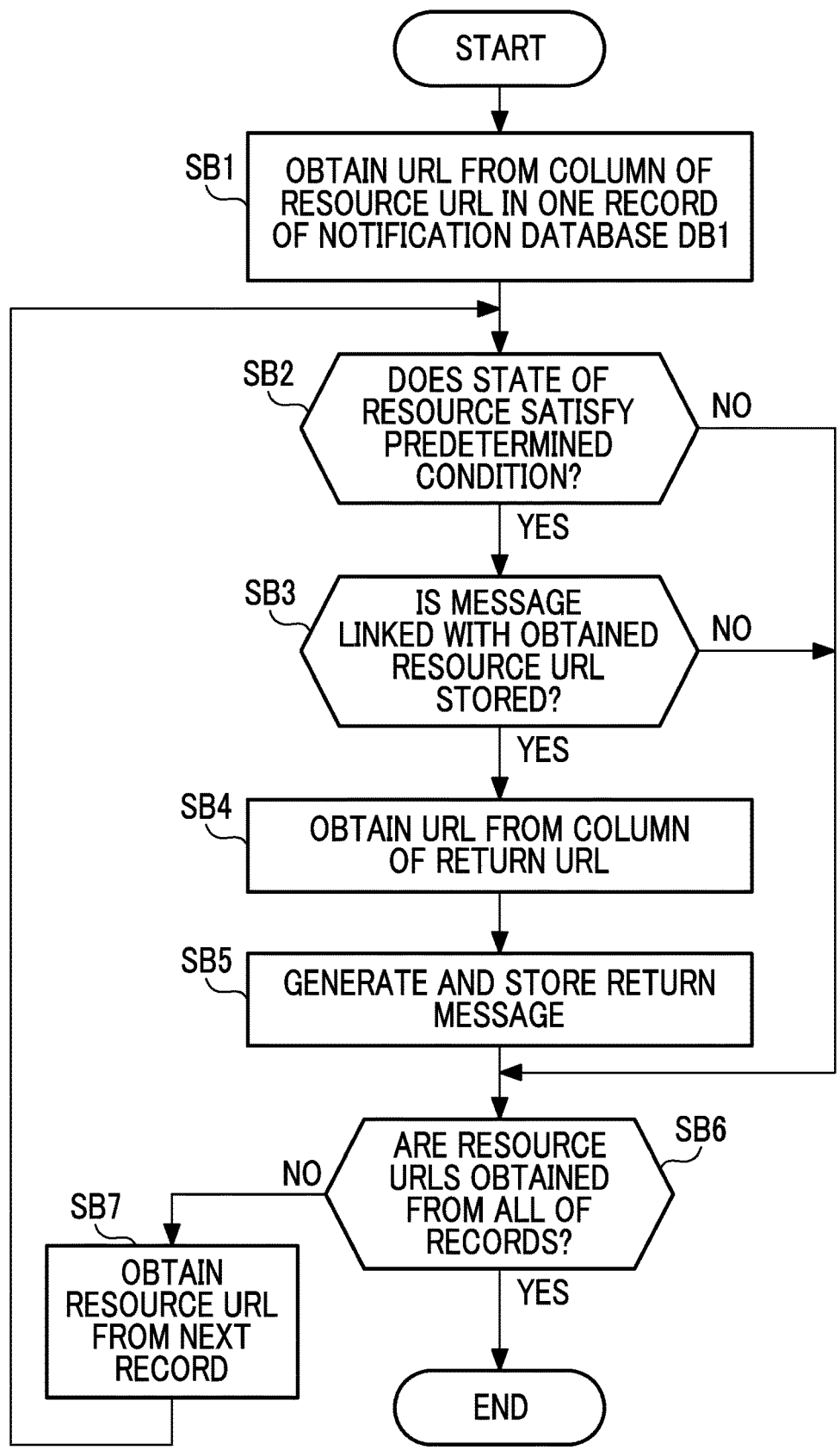

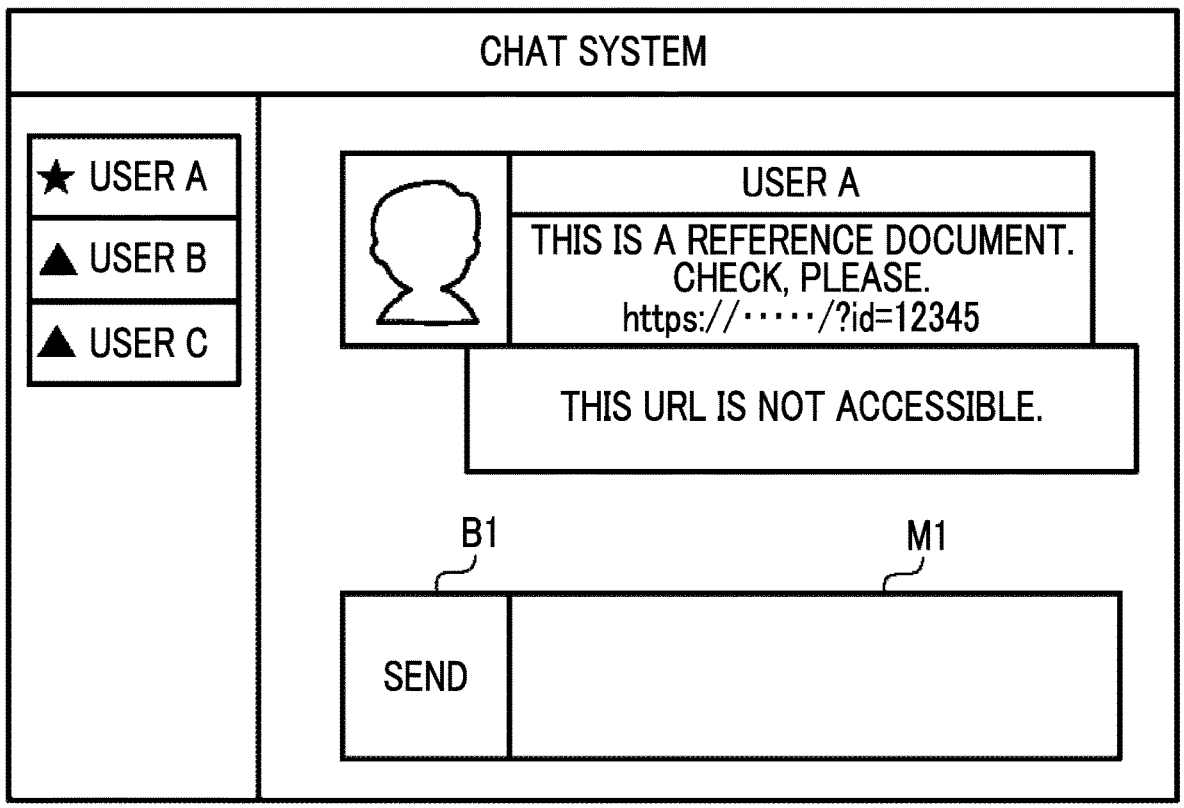

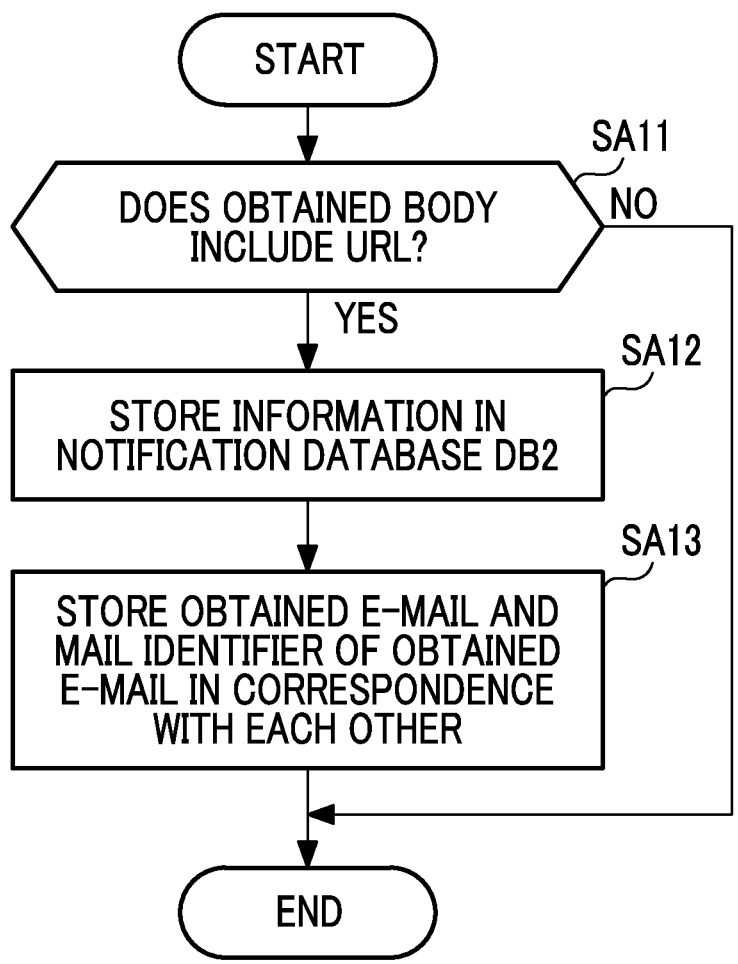

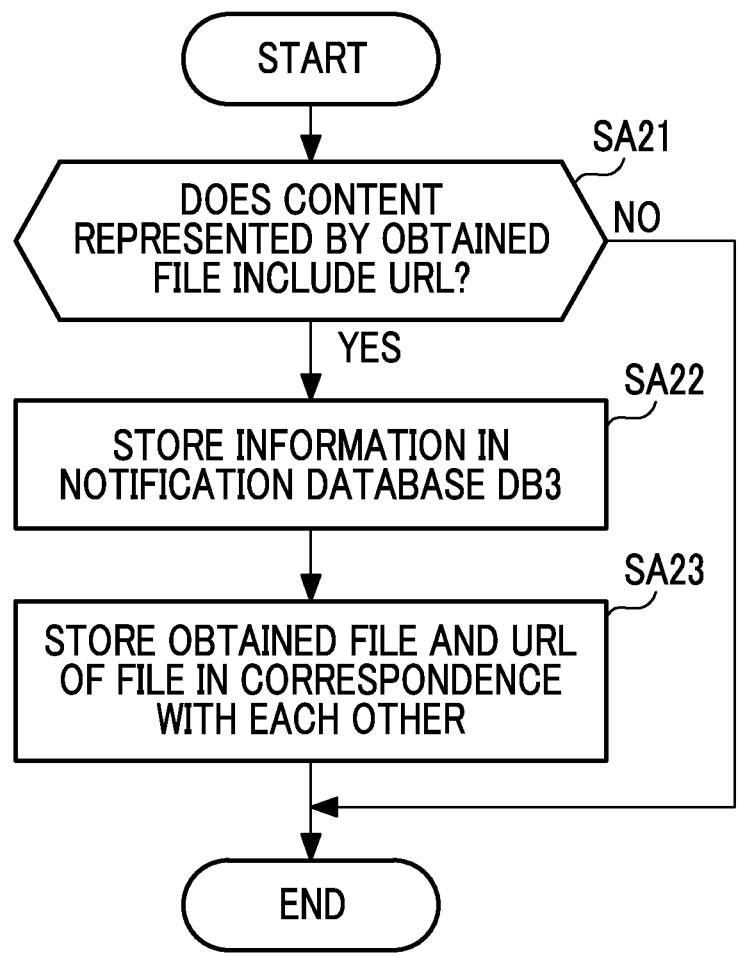

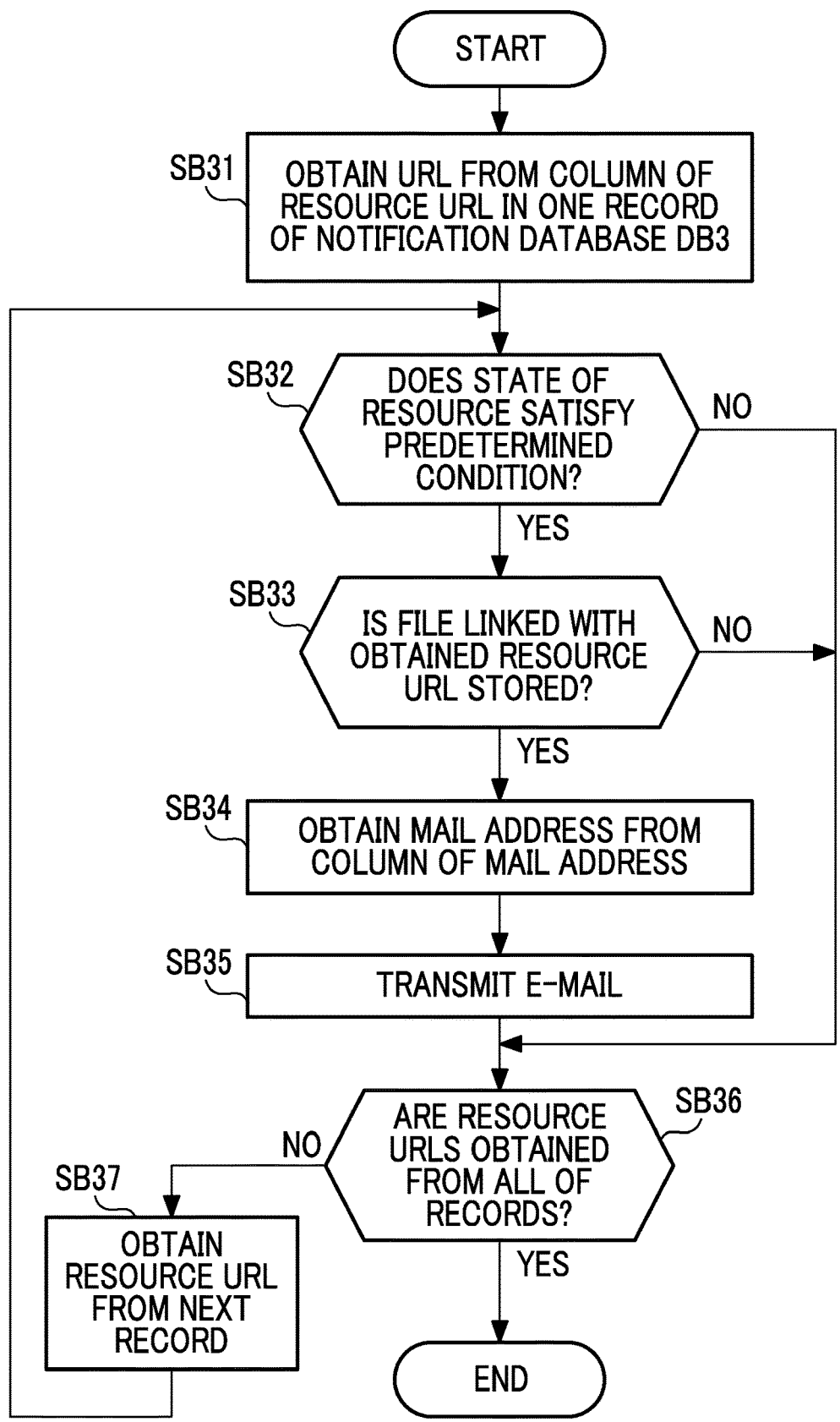

VERIFYING STATUS OF RESOURCES LINKED TO COMMUNICATIONS AND NOTIFYING INTERESTED PARTIES OF STATUS CHANGES

CROSS-REFERENCE TO RELATED APPLICATIONS

This application is based on and claims priority under 35 USC 119 from Japanese Patent Application No. 2018-044194 filed Mar. 12, 2018.

BACKGROUND

(i) Technical Field

The present invention relates to an information processing apparatus and a non-transitory computer readable medium storing a program.

(ii) Related Art

As an invention for informing a user of a broken link of a web browser, for example, JP2006-293832A discloses an image forming apparatus. The image forming apparatus includes a function of the web browser and in a case where an object is not stored in a storage area of the object specified by a URI registered in the web browser, prints the registered URI.

SUMMARY

By writing a URI on an e-mail or a web page, it is possible to link a plurality of documents. For example, in the case of writing the URI on a body of the e-mail, by operating the URI written on the e-mail, it is possible to refer to the web page specified by the URI. However, the web page specified by the URI written on the body may be deleted by an administrator of the web page. In a case where the web page is deleted, even by operating the URI written on the e-mail, it is not possible to refer to the web page. Further, until operating the URI, it is not possible to know whether or not the web page is deleted.

Aspects of non-limiting embodiments of the present disclosure relate to an information processing apparatus and a non-transitory computer readable medium storing a program, which provide a technology of notifying a state of a resource of a person who is related to a content in a case where resource information indicating the resource is included in the content.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an obtaining section that obtains a content; a linking section that extracts resource information indicating a resource from the content obtained by the obtaining section and links the content, a notification destination, and the extracted resource information; and a notification section that obtains a state of the resource indicated by the resource information and in a case where the obtained state satisfies a predetermined condition, transmits a notification to the notification destination linked with the resource information.

BRIEF DESCRIPTION OF THE DRAWINGS

Exemplary embodiment(s) of the present invention will be described in detail based on the following figures, wherein:

FIG. 4 illustrates an example of a notification database DB1;

FIG. 5 is a functional block diagram illustrating a configuration of a function realized by the server device 20;

FIG. 9 is a flowchart illustrating a flow of another process performed by the server device 20;

FIG. 10 is a diagram illustrating an example of a screen displayed on the terminal device 10;

FIG. 11 illustrates an example of a notification database DB2;

FIG. 12 is a flowchart illustrating a flow of a process performed by a server device 20 according to a second exemplary embodiment;

FIG. 14 illustrates an example of a notification database DB3;

FIG. 15 is a flowchart illustrating a flow of a process performed by a server device 20 according to a third exemplary embodiment; and FIG. 16 is a flowchart illustrating a flow of another process performed by the server device 20 according to the third exemplary embodiment.

DETAILED DESCRIPTION

First Exemplary Embodiment

Overall Configuration

Figure 1:
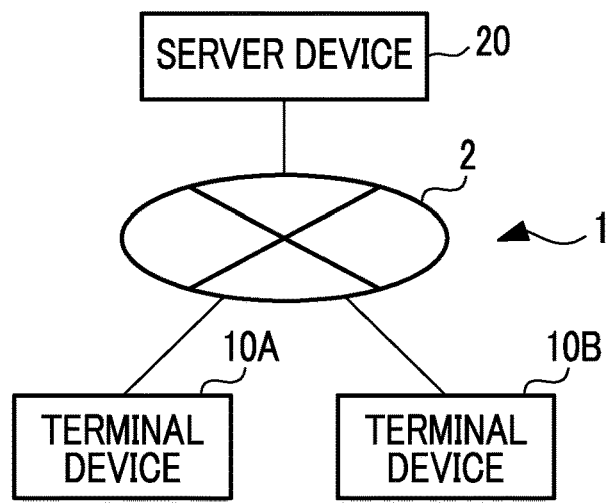
FIG. 1 is a diagram illustrating devices according to an information processing system 1 which is a first exemplary embodiment of the invention.

FIG. 1 is a diagram illustrating devices according to an information processing system 1 which is a first exemplary embodiment of the invention. A communication line 2 is a communication network in which data communication is performed, and a plurality of computer devices which perform the data communication are connected to the communication line 2. The communication line 2 includes a wired and wireless communication network.

Terminal devices 10A and 10B are devices which perform data communication and in the present exemplary embodiment, the terminal devices 10A and 10B are personal computers. The terminal devices 10A and 10B perform the data communication with a server device 20 via the communication line 2 by wired or wireless and function as clients of the server device 20. The terminal devices 10A and 10B may be a laptop personal computer, a smartphone, or a tablet terminal. Since configurations of the terminal devices 10A and 10B are the same, in the following description, in a case where it is not necessary to distinguish the terminal devices 10A and 10B from each other, the terminal devices 10A and 10B are referred to as a terminal device 10.

The server device 20 is a device which functions as a server of a client server system and is an example of an information processing apparatus according to the exemplary embodiment of the invention. The server device 20 provides a chat service for exchanging messages with two or more people, to the terminal device 10. In addition, the server device 20 has a function of notifying a determined notification destination of a state of information indicated by a uniform resource locator (URL) included in the message exchanged by the chat. The message exchanged by the chat is an example of a content according to the exemplary embodiment of the invention. The URL included in the message exchanged by the chat is an example of resource information according to the exemplary embodiment of the invention. The information indicated by the URL is an example of a resource according to the exemplary embodiment of the invention.

Configuration of Terminal Device 10

Figure 2:
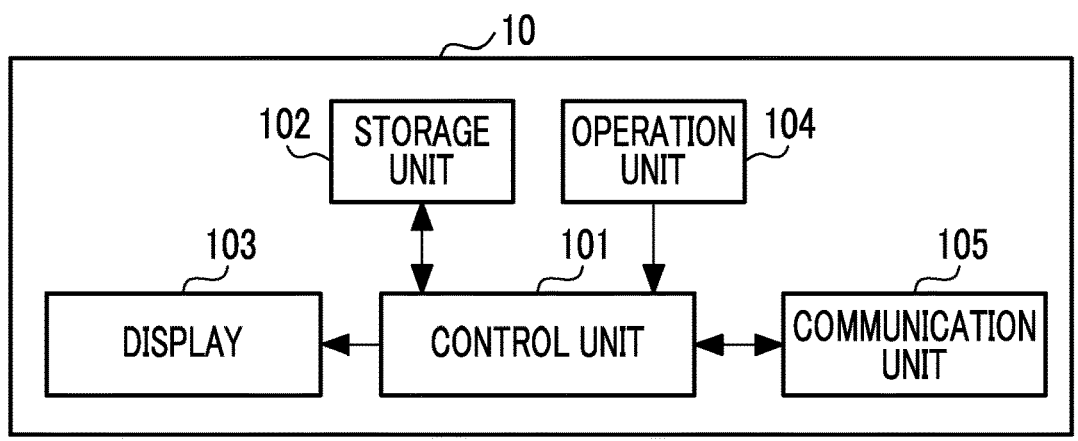
FIG. 2 is a block diagram illustrating a hardware configuration of a terminal device 10.

FIG. 2 is a block diagram illustrating a hardware configuration of the terminal device 10. In a case where it is necessary to distinguish respective units of the terminal devices 10A and 10B, for convenience of description, an alphabet at an end of the reference numeral of the terminal device 10 is added to an end of the reference numeral of each of the units for the description. For example, in a case of distinguishing each of units of the terminal device 10A from each of units of the other terminal device 10B, "A" is attached to an end of the reference numeral of each of the units of the terminal device 10A.

A display 103 displays a text, a GUI, and the like. An operation unit 104 is a keyboard or a mouse and is operated by a user. A communication unit 105 functions as a communication interface for performing communication via the communication line 2. A storage unit 102 has a non-volatile memory for storing data and stores a program of an operating system, an application program, data used by the application program, and the like. A control unit 101 includes a central processing unit (CPU) and a random access memory (RAM), and executes the program of the operating system and the application program.

Configuration of Server Device 20

Figure 3:
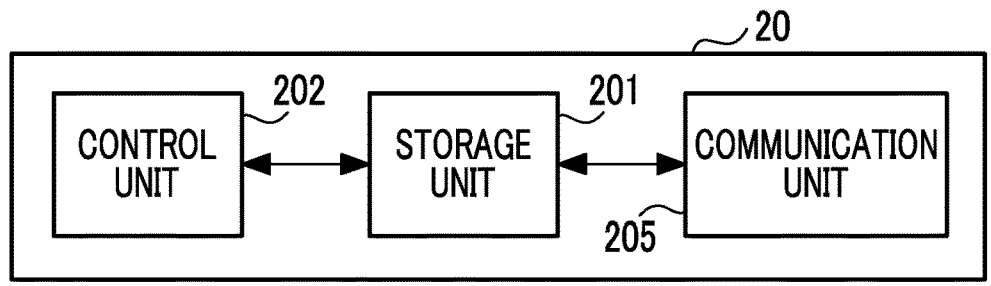
FIG. 3 is a block diagram illustrating a hardware configuration of a server device 20.

FIG. 3 is a block diagram illustrating an example of a hardware configuration of the server device 20. A communication unit 205 functions as a communication interface for performing data communication via the communication line 2.

A storage unit 202 has a non-volatile memory and stores a program executed by a control unit 201. In addition, the storage unit 202 stores the message exchanged by the chat service and a notification database DB1. FIG. 4 illustrates an example of information stored in the notification database DB1. The column of "message URL" stores a URL for indicating a message of a chat including a URL. The column of "resource URL" stores the URL included in the message of the chat. The column of "return URL" stores a URL for indicating a message which is a return message to the message indicated by the URL stored in "message URL".

The control unit 201 includes a central processing unit (CPU) and a memory. The function of the server device 20 is realized by reading a program (software) stored in the storage unit 202 on hardware such as the CPU and the memory, causing the CPU to perform calculation, and controlling the storage unit 202, the communication unit 205, and reading and/or writing data in the memory and the storage unit 202.

Functional Configuration of Server Device 20

FIG. 5 is a block diagram illustrating a configuration of a function according to the exemplary embodiment of the invention among functions realized by the server device 20.

An obtaining unit 2001 obtains contents transmitted from the terminal device 10. The content obtained by the obtaining unit 2001 is, for example, a message, an e-mail, a file, or the like of a chat.

A linking unit 2002 extracts a URL, which is resource information for indicating a resource, from the content obtained by the obtaining unit 2001 and links the obtained content and notification destination with the extracted URL.

A notification unit 2003 obtains a state of the resource indicated by the resource information and, in a case where the obtained state satisfies a predetermined condition, transmits a notification to a notification destination linked with the resource information.

Operation Example of First Exemplary Embodiment

Next, as an operation example according to the first embodiment, an operation example in a case where a message including a URL is transmitted by a chat from a user A of the terminal device 10A to a user B of the terminal device 10B will be described.

Figure 6:
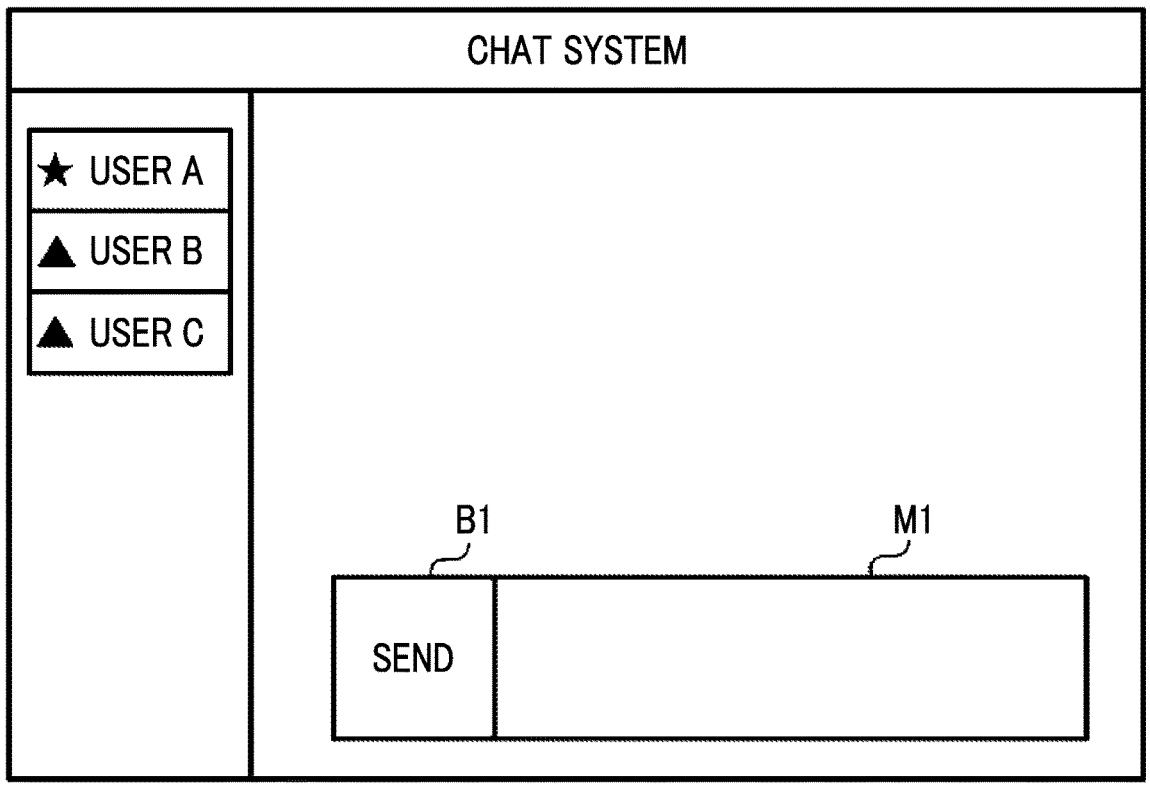
FIG. 6 is a diagram illustrating an example of a screen of a user interface supplied to the terminal device 10.

FIG. 6 is a diagram illustrating an example of a screen of a user interface supplied from the server device 20 to the terminal device 10 in the chat service supplied by the server device 20. In a case where the user A logs in the chat service supplied by the server device 20 by operating the terminal device 10A, the terminal device 10 displays a screen illustrated in FIG. 6. The example of the screen in FIG. 6 illustrates a user name of the user registered in advance by the user A as a member who exchanges messages is illustrated.

In a case of transmitting a message to the user B in members registered in advance, the user A selects "user B" in a list of the members on a left side as a destination and inputs a message to an input box Ml of the message. The message may include a URL and may include, for example, a URL of a file, a URL of a web page, and the like. The file or the web page specified by the URL is an example of the resource according to the exemplary embodiment of the invention. The file is, for example, a file such as a document, a still image, a movie, an audio, and the like.

In a case where the user A who finishes inputting the message performs an operation of clicking a button B1 of "send" on the screen, the terminal device 10A transmits the user name (user A) of the user who inputs the message, the input message, and the user name (user B) of the user selected as a destination of the message, to the server device 20.

Figure 7:
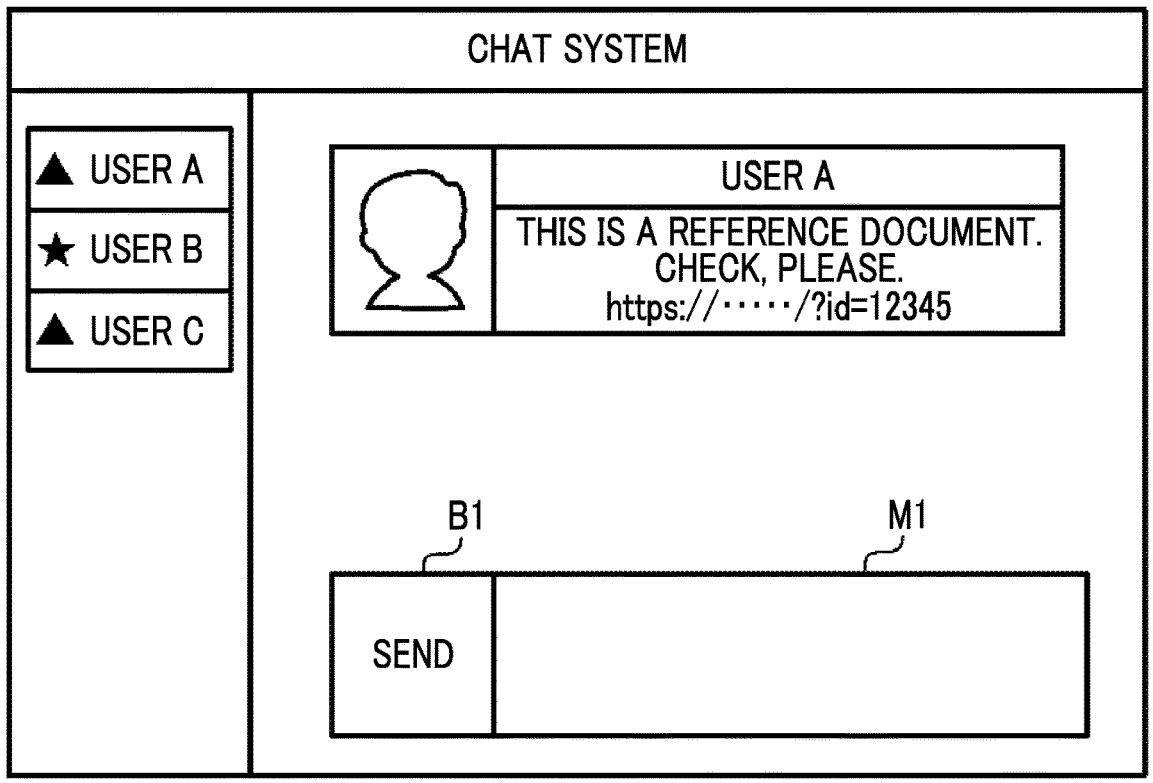
FIG. 7 is a diagram illustrating an example of a screen on which a message is displayed.

The server device 20 (obtaining unit 2001) obtains the message and the user name transmitted from the terminal device 10A. The server device 20 transmits the obtained message to the terminal device 10B used by the user B, who is logged in the chat service, designated as a destination. The terminal device 10B which obtains the message, displays the message transmitted from the server device 20, for example, as illustrated in FIG. 7.

Figure 8:
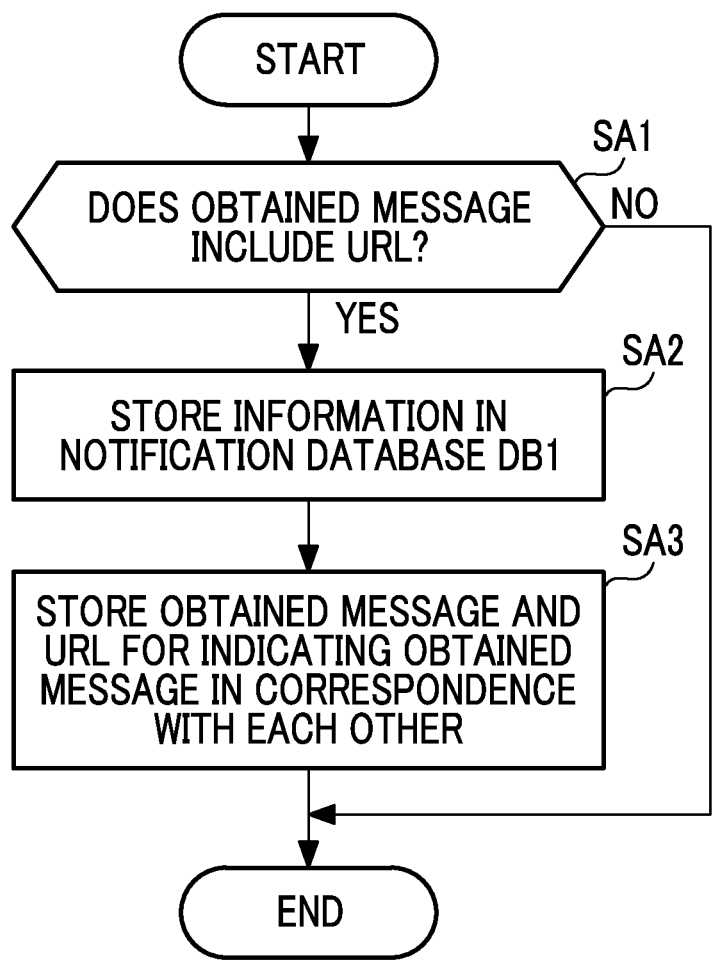
FIG. 8 is a flowchart illustrating a flow of a process performed by the server device 20.

In addition, the server device 20 which obtains the message and the user name from the terminal device 10A, executes processes illustrated in FIG. 8. First, the server device 20 determines whether or not the obtained message includes the URL (step SA1). In a case where the obtained message does not include the URL (NO in step SA1), the server device 20 terminates the process in FIG. 8.

In a case where the obtained message includes the URL (YES in step SA1), the server device 20 (linking unit 2002) stores the information in the notification database DB1 (step SA2). Specifically, the server device 20 stores the URL for indicating the obtained message in the column of "message URL" of the notification database DB1 and stores the URL included in the obtained message in the column of "resource URL" of the notification database DB1. In addition, the server device 20 generates the URL for indicating the return message to the obtained message and stores the generated URL in the column of "return URL" of the notification database DB1. That is, the server device 20 (linking unit 2002) extracts the URL, which is resource information for indicating the resource, from the obtained message (content) and links the obtained message, the URL (notification destination) for indicating the return message to the obtained message, and the extracted URL. The server device 20 which terminates the process in step SA2, stores the obtained message and the URL for indicating the obtained message in correspondence with each other (step SA3).

Next, an operation example in a case where the state of the resource indicated by the resource URL stored in the notification database DB1 is changed will be described. The server device 20 executes processes illustrated in FIG. 9 at a predetermined timing such as a predetermined time or date.

First, the server device 20 obtains the URL (referred to as "resource URL") from the column of "resource URL" in one record of the notification database DB1 (step SB1). Next, the server device 20 (notification unit 2003) determines whether or not the state of the resource indicated by the obtained resource URL satisfies a predetermined condition (step SB2). Here, the server device 20 accesses to the resource indicated by the obtained resource URL to obtain the state of the resource. For example, in a case where the server device 20 may access to the resource, the server device 20 obtains the state in which there is no change in the resource. In a case where the server device 20 may not access to the resource, the server device 20 obtains the state of a change in the resource. The case where the server device 20 may access to the resource is, for example, a case where a response such as "404 Not Found" or "410 Gone" to a request of a hypertext transfer protocol (HTTP) is obtained. In a case where the state of the resource does not satisfy the predetermined condition that there is a change without being changed (NO in step SB2), the server device 20 moves the flow of the process to step SB6.

In a case where the predetermined condition that the state of the resource is changed is satisfied (YES in step SB2), the server device 20 determines whether or not the message linked with the obtained resource URL is stored (step SB3). Here, the server device 20 obtains the URL (hereinafter, referred to as "message URL") stored in the column of "message URL" of the record in which the obtained resource URL is stored and determines whether or not the message indicated by the obtained message URL is stored in the storage unit 202.

In a case where the message indicated by the obtained message URL is deleted, for example, by an operation of the user and is not stored in the storage unit 202 (NO in step SB3), the server device 20 moves the flow of the process to step SB6. On the other hand, in a case where the message indicated by the obtained message URL is stored in the storage unit 202, the server device 20 obtains the URL (hereinafter, referred to as "return URL") stored in the column of "return URL" of the record in which the obtained message URL is stored (step SB4).

Next, the server device 20 (notification unit 2003) generates a message having a content for notifying that the obtained resource URL is not accessible, as a return message indicated by the obtained return URL and stores the obtained return URL and the generated message in correspondence with each other in the storage unit 202 (step SB5).

Next, the server device 20 determines whether or not to obtain the resource URLs from all of the records in the notification database DB1 (step SB6). In a case where the resource URL is not obtained from all of the records in the notification database DB1, the server device 20 obtains the resource URL from the next record (step SB7) and returns the flow of the process to step SB2. In a case where the obtainment of the resource URLs from all of the records in the notification database DB1 is completed, the server device 20 terminates the process in FIG. 9.

According to the process illustrated in FIG. 9, for example, in a case where the resource indicated by the URL included in the message transmitted from the user A to the user B, is at a predetermined state in which the resource is not accessible, the server device 20 determines on YES in step SB2. Next, in a case where the message transmitted from the user A to the user B is not deleted and is stored in the storage unit 202 (YES in step SB3), as a return message to the message transmitted from the user A to the user B, the server device 20 generates and stores a message for notifying that the resource indicated by the URL included in the message transmitted from the user A to the user B is not accessible (steps SB4 and SB5). The message is an example of the notification according to the exemplary embodiment of the invention.

After the return message is generated, in a case where the user A refers to the message transmitted from the user A to the user B in the terminal device 10A, as illustrated in FIG. 10, the message for notifying that the resource indicated by the URL included in the transmitted message is not accessible is displayed as a return message to the message transmitted from the user A to the user B and the user A may know that the information indicated by the URL is not accessible. In addition, also in a case where the user B refers to the message transmitted from the user A to the user B in the terminal device 10B, the message for notifying that the resource indicated by the URL included in the transmitted message is not accessible is displayed as a return message to the message transmitted to the user B and the user B may know that the resource indicated by the URL is not accessible.

Second Exemplary Embodiment

Next, a second exemplary embodiment of the invention will be described. The apparatus according to the second exemplary embodiment of the invention includes the same terminal devices 10A and 10B and the same server device 20 as in the first embodiment, and a hardware configuration of each of the devices is the same as in the first embodiment. In the present exemplary embodiment, processes performed by each of the devices are different, the server device 20 provides a web mail service, and the terminal devices 10A and 10B exchange an e-mail by using the web mail service. Therefore, a description of the same configuration as the first embodiment will be omitted and hereinafter, a difference from the first embodiment will be described.

The storage unit 202 stores a notification database DB2. FIG. 11 illustrates an example of information stored in the notification database DB2. The column of "mail identifier" stores an identifier for identifying an e-mail including a body having a URL. The identifier may be, for example, a subject of the e-mail or may be an identifier generated for each of e-mails. The column of "resource URL" stores the URL included in the body of the e-mail. The column of "mail address" stores a mail address of a sender of the e-mail and a mail address of a receiver of the e-mail.

Operation Example of Second Exemplary Embodiment

Next, as an operation example according to the second exemplary embodiment, an operation example in a case where the e-mail including the URL is transmitted from the user A of the terminal device 10A to the user B of the terminal device 10B will be described.

The user A logs in the web mail service which is a service of an e-mail supplied by the server device 20 by operating the terminal device 10A. In a case where the terminal device 10A logs in the web mail service, a graphical user interface (GUI) of the web mail is displayed on the terminal device 10A. In a case of transmitting the e-mail to the user B, the user A performs an operation of instructing a display of a creation screen of a new mail on the displayed GUI screen on the terminal device 10A. In a case of performing the operation, the terminal device 10A displays a screen for inputting a destination of the e-mail and a body of the e-mail. The user A inputs the user B as a destination and inputs the body of the e-mail to the displayed screen. The body of the e-mail may include a URL and may include a URL of a file, a URL of a web page, and the like. The URL is an example of the resource information according to the exemplary embodiment of the invention and the file or the web page indicated by the URL is an example of the resource according to the exemplary embodiment of the invention.

In a case where the user A who completes the input of the message performs an operation of instructing transmission of the e-mail on the displayed screen, the terminal device 10A transmits a mail address of the user who inputs the body, the input body, and a mail address of the user B selected as a destination of the e-mail to the server device 20 as an e-mail. The e-mail is an example of the content according to the exemplary embodiment of the invention.

The server device 20 (obtaining unit 2001) obtains and stores the e-mail transmitted from the terminal device 10A. In a case where the user B operates the terminal device 10B to log in the web mail service, the terminal device 10B obtains and displays the e-mail transmitted from the user A to the user B as a destination.

In addition, the server device 20 executes processes illustrated in FIG. 12. First, the server device 20 determines whether or not the body of the obtained e-mail includes the URL (step SA11). In a case where the obtained body does not include the URL (NO in step SA11), the server device 20 terminates the process in FIG. 12.

In a case where the body of the obtained e-mail includes the URL (YES in step SA11), the server device 20 (linking unit 2002) stores the information in the notification database DB2 (step SA12). Specifically, the server device 20 stores the mail identifier for identifying the obtained e-mail in the column of "mail identifier" of the notification database DB2 and stores the URL included in the obtained e-mail in the column of "resource URL" of the notification database DB2. In addition, the server device 20 stores the mail address of the sender of the obtained e-mail and the mail address of the destination of the e-mail in the column of "mail address" of the notification database DB2. That is, the server device 20 (linking unit 2002) extracts the URL, which is resource information for indicating the resource, from the obtained e-mail (content) and links the obtained e-mail, the destination (notification destination) of the e-mail, and the extracted URL. The server device 20 which terminates the process in step SA12, stores the obtained e-mail and the mail identifier for identifying the obtained e-mail in correspondence with each other (step SA13).

Next, an operation example in a case where the state of the resource indicated by the resource URL stored in the notification database DB2 is changed will be described. The server device 20 executes processes illustrated in FIG. 13 at a predetermined timing such as a predetermined time or date.

First, the server device 20 obtains the URL (referred to as "resource URL") from the column of "resource URL" in one record of the notification database DB2 (step SB11). Next, the server device 20 determines whether or not the state of the resource indicated by the obtained resource URL satisfies a predetermined condition (step SB12). Here, the server device 20 (notification unit 2003) accesses to the resource indicated by the obtained resource URL to obtain the state of the resource. For example, in a case where the server device 20 may access to the resource, the server device 20 obtains the state in which there is no change in the resource. In a case where the server device 20 may not access to the resource, the server device 20 obtains the state of a change in the resource. In a case where the state of the resource does not satisfy the predetermined condition that there is a change without being changed (NO in step SB12), the server device 20 moves the flow of the process to step SB16.

In a case where the predetermined condition that the state of the resource is changed is satisfied (YES in step SB12), the server device 20 determines whether or not the e-mail linked with the obtained resource URL is stored (step SB13). Here, the server device 20 obtains the identifier stored in the column of "mail identifier" of the record in which the obtained resource URL is stored and determines whether or not the e-mail in correspondence with the obtained identifier is stored.

In a case where the e-mail corresponding to the obtained identifier is deleted, for example, by an operation of the user and is not stored in the storage unit 202 (NO in step SB13), the server device 20 moves the flow of the process to step SB16. On the other hand, in a case where the e-mail corresponding to the obtained identifier is stored in the storage unit 202, the server device 20 obtains the mail address stored in the column of "mail address" of the record in which the obtained identifier is stored (step SB14).

Next, the server device 20 (notification unit 2003) generates an e-mail having a content for notifying that the obtained resource URL is not accessible and transmits the e-mail to the destination of the generated e-mail as the mail address obtained in step SB14 (step SB15). The generated e-mail may include the subject of the e-mail specified by the obtained identifier. The e-mail is an example of a notification according to the exemplary embodiment of the invention.

Next, the server device 20 determines whether or not to obtain the resource URLs from all of the records in the notification database DB2 (step SB16). In a case where the resource URL is not obtained from all of the records in the notification database DB2, the server device 20 obtains the resource URL from the next record (step SB17) and returns the flow of the process to step SB12. In a case where the obtainment of the resource URLs from all of the records in the notification database DB2 is completed, the server device 20 terminates the process in FIG. 13.

Figure 13:
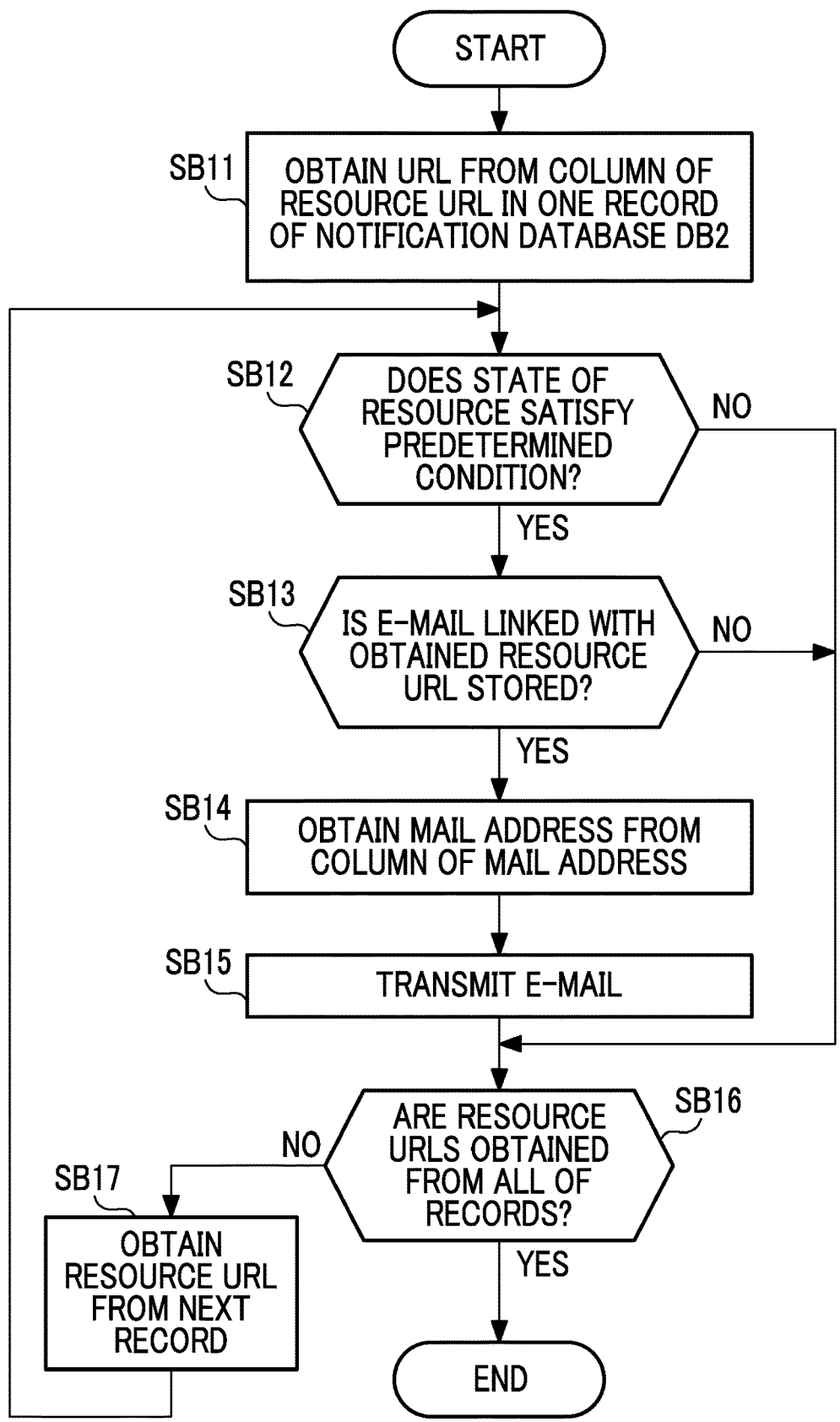
FIG. 13 is a flowchart illustrating a flow of another process performed by the server device 20 according to the second exemplary embodiment.

According to the process illustrated in FIG. 13, for example, in a case where the resource indicated by the URL included in the e-mail transmitted from the user A to the user B, is at a predetermined state in which the resource is not accessible, the server device 20 determines on YES in step SB12. Next, in a case where the e-mail transmitted from the user A to the user B is not deleted and is stored in the storage unit 202 (YES in step SB13), the server device 20 generates an e-mail for notifying that the resource indicated by the URL included in the e-mail transmitted from the user A to the user B is not accessible and transmits the generated e-mail to the user A and the user B as a destination (steps SB14 and SB15).

In a case where the user A opens the e-mail in the terminal device 10A, the subject of the e-mail transmitted to the user B and the message for notifying that the resource indicated by the URL included in the e-mail transmitted to the user B is not accessible are displayed, so that the user A may know that the URL transmitted by the e-mail is not accessible. In a case where the user B opens the e-mail transmitted in step SB15 in the terminal device 10B, the subject of the e-mail transmitted from the user A to the user B and the message for notifying that the resource indicated by the URL included in the e-mail transmitted from the user A to the user B is not accessible are displayed, so that the user B may know that the URL included in the e-mail received in the past is not accessible.

Third Exemplary Embodiment

Next, a third exemplary embodiment of the invention will be described. The apparatus according to the third exemplary embodiment of the invention includes the same terminal devices 10A and 10B and the same server device 20 as in the first embodiment, and a hardware configuration of each of the devices is the same as in the first embodiment. In the present exemplary embodiment, processes performed by each of the devices are different, the server device 20 includes a file management function of managing a file for representing a content, and the terminal devices 10A and 10B upload the file to the server device 20 or download the file from the server device 20. In the present exemplary embodiment, the content represented by the file is an example of a document. Hereinafter, a description of the same configuration as the first embodiment will be omitted and a difference from the first embodiment will be described.

The storage unit 202 stores a notification database DB3. FIG. 14 illustrates an example of information stored in the notification database DB3. The column of "content URL" stores a URL of a file managed by the server device 20. The column of "resource URL" stores a URL included a content represented by the file. The column of "mail address" stores a mail address of a writer of the file.

Operation Example of Third Exemplary Embodiment

Next, as an operation example according to the third exemplary embodiment, an operation example in a case where the user A uploads the file from the terminal device 10A to the server device 20 will be described.

The user A operates the terminal device 10A to upload the file to the server device 20. The content represented by the uploaded file may include, for example, a URL of another file, a URL of a web page, and the like. In addition, the uploaded file includes the mail address of the writer of the file as metadata. The uploaded file is an example of the content according to the exemplary embodiment of the invention. The URL included in the file is an example of the resource information according to the exemplary embodiment of the invention and the file or the web page indicated by the URL is an example of the resource according to the exemplary embodiment of the invention.

The server device 20 (obtaining unit 2001) obtains and stores the file transmitted from the terminal device 10A. The server device 20 which obtains the file executes processes illustrated in FIG. 15. First, the server device 20 determines whether or not the content represented by the obtained file includes the URL (step SA21). In a case where the content represented by the obtained file does not include the URL (NO in step SA21), the server device 20 terminates the process in FIG. 15.

In a case where the content represented by the obtained file includes the URL (YES in step SA21), the server device 20 stores the information in the notification database DB3 (step SA22). Specifically, the server device 20 (linking unit 2002) stores the URL of the obtained and stored file in the column of "content URL" of the notification database DB3 and stores the URL included in the content represented by the obtained file in the column of "resource URL" of the notification database DB3. In addition, the server device 20 obtains the mail address of the writer of the obtained file from the metadata of the file and stores the mail address in the column of "mail address" of the notification database DB3. The server device 20 which terminates the process in step SA22, stores the obtained file and the URL of the obtained file in correspondence with each other (step SA23).

Next, an operation example in a case where the state of the resource indicated by the resource URL stored in the notification database DB3 is changed will be described. The server device 20 executes processes illustrated in FIG. 16 at a predetermined timing.

First, the server device 20 obtains the URL (referred to as "resource URL") from the column of "resource URL" in one record of the notification database DB3 (step SB31). Next, the server device 20 determines whether or not the state of the resource indicated by the obtained resource URL satisfies a predetermined condition (step SB32). Here, the server device 20 (notification unit 2003) accesses to the resource indicated by the obtained resource URL to obtain the state of the resource. For example, in a case where the server device 20 may access to the resource, the server device 20 obtains the state in which there is no change in the resource. In a case where the server device 20 may not access to the resource, the server device 20 obtains the state of a change in the resource. In a case where the state of the resource does not satisfy the predetermined condition that there is a change without being changed (NO in step SB32), the server device 20 moves the flow of the process to step SB36.

In a case where the predetermined condition that the state of the resource is changed is satisfied (YES in step SB32), the server device 20 determines whether or not the file linked with the obtained resource URL is stored (step SB33). Here, the server device 20 obtains the URL stored in the column of "content URL" of the record in which the obtained resource URL is stored and determines whether or not the file indicated by the obtained URL is stored.

In a case where the file indicated by the obtained URL is deleted, for example, by an operation of the user and is not stored in the storage unit 202 (NO in step SB33), the server device 20 moves the flow of the process to step SB36. On the other hand, in a case where the file indicated by the obtained URL is stored in the storage unit 202, the server device 20 obtains the mail address stored in the column of "mail address" of the record in which the obtained URL is stored (step SB34).

Next, the server device 20 (notification unit 2003) generates an e-mail having a content for notifying that the obtained resource URL is not accessible and transmits the e-mail to the destination of the generated e-mail as the mail address obtained in step SB14 (step SB35). The generated e-mail may include a file name of the file indicated by the URL stored in the column of the content URL of the record in which the obtained resource URL is stored. The e-mail is an example of the notification according to the exemplary embodiment of the invention.

Next, the server device 20 determines whether or not to obtain the resource URLs from all of the records in the notification database DB3 (step SB36). In a case where the resource URL is not obtained from all of the records in the notification database DB3, the server device 20 obtains the resource URL from the next record (step SB37) and returns the flow of the process to step SB32. In a case where the obtainment of the resource URLs from all of the records in the notification database DB3 is completed, the server device 20 terminates the process in FIG. 16.

According to the process illustrated in FIG. 16, for example, in a case where the resource indicated by the URL included in the file uploaded from the terminal device 10A to the server device 20, is at a predetermined state in which the resource is not accessible, the server device 20 determines on YES in step SB32. Next, in a case where the file uploaded from the terminal device 10A is not deleted and is stored in the storage unit 202 (YES in step SB33), the server device 20 generates an e-mail for notifying that the resource indicated by the URL included in the uploaded file is not accessible and transmits the generated e-mail to the writer of the file as a destination (steps SB34 and SB35).

In a case where the writer of the file opens the e-mail, the message for notifying that the resource indicated by the URL included in the file generated by the writer is not accessible is displayed, so that the writer may know that the URL written on the document represented by the generated file is not accessible.

In a case where it is determined as YES in step SB33 and in a case where the file including the obtained resource URL is the file representing the document, the server device 20 may attach an annotation having a content for notifying that the obtained resource URL is not accessible, to the document represented by the file. In a case where the terminal device 10 downloads the file and opens the downloaded file, the annotation for notifying that the written URL is not accessible is displayed and a person who opens the file may know that the URL is not accessible. The annotation included in the content is an example of the notification according to the exemplary embodiment of the invention.

Further, in the third exemplary embodiment, the server device 20 may be configured to have a function of a web server and to manage a file representing the web page. In the case of managing the file of the web page, the URL of the file of the uploaded web page is stored in the column of "content URL" in the notification database DB3, the URL written on the uploaded web page is stored in the column of "resource URL" in the notification database DB3, the mail address of the writer of the file of the web page is stored in the column of "mail address" in the notification database DB3. The server device 20 determines whether or not the URL stored in the column of the resource URL is accessible. In a case where the URL is not accessible, the server device 20 generates an e-mail having a content for notifying that the resource URL is not accessible and transmits the generated e-mail to the mail address stored in the column of the mail address as a destination of the generated e-mail. In the exemplary embodiment of the invention, the destination of the e-mail for notifying that the URL is not accessible may have a different configuration according to a type of the content represented by the file. For example, in a case where the file is a file representing the document, the destination of the e-mail for notifying that the URL is not accessible is the writer of the file. For example, in a case where the file is a file representing the web page, the destination of the e-mail for notifying that the URL is not accessible is an administrator of the server device 20 which provides the function of the web server.

Modification

The exemplary embodiments of the invention are described above, but the exemplary embodiment of the invention is not limited to the exemplary embodiment described above and may be implemented in various forms. For example, the exemplary embodiment of the invention may be implemented by modifying the exemplary embodiment described above as follows. The exemplary embodiment described above and a following modification may be combined.

In the third exemplary embodiment described above, the file is a file representing a document, but the file may be a still image file representing a still image or a movie file representing a movie. In a case of obtaining the uploaded still image file or the uploaded movie file, the server device 20 stores the URL of the obtained and stored still image file or the obtained and stored movie file in the column of the content URL in the notification database DB3, stores the URL included in the still image or the movie represented by the obtained file in the column of the resource URL in the notification database DB3, and stores the e-mail address of the writer included as the metadata of the obtained file in the column of the mail address in the notification database DB3. The server device 20 determines whether or not the URL stored in the column of the resource URL in the notification database DB3 is accessible. In a case where the URL is not accessible, the server device 20 generates an e-mail having a content for notifying that the resource URL is not accessible and transmits the generated e-mail to the mail address stored in the column of the mail address in the notification database DB3 as a destination of the generated e-mail.

In addition, the server device 20 may be configured to manage an audio file representing an audio as a content. In a case of obtaining the uploaded audio file, the server device 20 stores the URL of the obtained and stored file in the column of the content URL in the notification database DB3, stores the URL included as information by inaudible sound in the audio represented by the obtained file in the column of the resource URL in the notification database DB3, and stores the e-mail address of the writer of the file included as the metadata of the obtained file in the column of the mail address in the notification database DB3. The server device 20 determines whether or not the URL stored in the column of the resource URL in the notification database DB3 is accessible. In a case where the URL is not accessible, the server device 20 generates an e-mail having a content for notifying that the resource URL is not accessible and transmits the generated e-mail to the mail address stored in the column of the mail address in the notification database DB3 as a destination of the generated e-mail.

In the exemplary embodiment of the invention, in a case where the URL included in the file transmitted from the terminal device 10 is changed, the resource URL in the notification database DB3 may be updated to the changed URL. For example, in a case where the URL included in the content of the uploaded file is changed and the file having the changed URL is uploaded to the server device 20, the server device 20 may replace the file already stored and before update with the file after the update and may update the column of the resource URL of the record in the notification database DB3 in which the URL of the replaced file is stored, to the URL included in the file after the update. In addition, in the present modification, the server device 20 may generate an e-mail for notifying that the URL is updated and may transmit the generated e-mail to the address stored in the column of the mail address of the record in the notification database DB3 as a destination. According to the modification, the notification that the URL included in the file is changed may be transmitted to a predetermined person. The e-mail transmitted in the modification may include the body including the URL after the update.

In addition, in a configuration in which the updated URL is notified, a destination of the e-mail for notifying that the URL is updated may be selected by a user who uploads the updated file so that the e-mail for notifying that the URL is updated is transmitted to a selected destination. The destination selected here is an example of a destination designated from an outside the system. In addition, in a case of uploading the updated file, information indicating a reason for updating the URL may be transmitted to the server device 20. In a case of transmitting the e-mail for notifying that the URL is updated, the body of the e-mail may include the transmitted reason for updating the URL. Further, in the first embodiment, in a case of changing the URL included in the message or the file, the server device 20 may ask whether to transmit a feedback to the message and the user may input the reason for the change and the changed URL and transmit the feedback. In this configuration, in a case where the terminal device 10 refers to the message including the changed URL, the reason for the change input by the user and the URL after the change may be displayed as a return message.

In the exemplary embodiment described above, the server device 20 confirms whether or not the URL included in the message, the e-mail, the file, or the like is accessible. However, for example, the terminal device 10 may confirm whether or not the URL included in the message, the e-mail, the file, or the like is accessible. For example, the terminal device 10A which uploads the file confirms whether or not the URL included in the document represented by the uploaded file is accessible at a predetermined timing. In a case where the URL included in the document represented by the file is not accessible, the terminal device 10A transmits the message, which includes the URL, for notifying that the URL is not accessible to the server device 20. In a case of obtaining the message, the server device 20 may specify the record including the column of the resource URL having the URL included in the obtained message, in the notification database DB3 and may transmit the e-mail having the content for notifying that the obtained URL is not accessible, to the mail address stored in the column of the mail address of the specified record as a destination.

In addition, the terminal device 10A which uploads the file may confirm whether or not the URL included in the content represented by the file is accessible, at a predetermined timing. In a case where the URL included in the content represented by the file is not accessible, the terminal device 10A may transmit the e-mail for notifying that the URL is not accessible, to a predetermined e-mail address for the file as a destination.

In the exemplary embodiment described above, the server device 20 confirms whether or not the URL included in the message, the e-mail, the file, or the like is accessible. However, for example, a device which stores the content indicated by the URL included in the file or the like, may confirm whether or not the URL included in the message, the e-mail, the file, or the like is accessible. For example, the server device 20 which obtains the uploaded file, instructs to monitor the state of the content indicated by the URL, to a device which stores the content indicated by the URL included in the document represented by the file. In a case where the content monitored by the device is not accessible, the device which monitors the content, transmits the URL of the content and the message for notifying that the content of the URL is not accessible, to the server device 20. In a case of obtaining the message and the URL, the server device 20 may specify the record including the column of the resource URL having the obtained URL, in the notification database DB3 and may transmit the e-mail having the content for notifying that the obtained URL is not accessible, to the mail address stored in the column of the mail address of the specified record as a destination.

In the first embodiment described above, the server device 20 may be configured to execute the process in FIG. 9 with the completion of the process in step SA2 after obtaining the message transmitted from the terminal device 10A. Further, in the second embodiment described above, the server device 20 may be configured to perform the process in FIG. 13 with the completion of the process in step SA12 after obtaining the e-mail transmitted from the terminal device 10A.

In the third exemplary embodiment described above, in a case where the server device 20 accesses to the uploaded file, the server device 20 may start the process in FIG. 16 with the access. In addition, in the third exemplary embodiment described above, in a case where the server device 20 downloads the uploaded file, the server device 20 may start the process in FIG. 16 with the download.

In the exemplary embodiment described above, in a case where the content indicated by the resource URL is not accessible, the server device 20 transmits the message or the e-mail for notifying that the content is not accessible, but the configuration is not limited thereto. For example, the server device 20 may provide a column for storing the state of the resource indicated by the resource URL to the notification databases DB1 to DB3. By comparing the stored state with the access result, in a case where the state of the content indicated by the resource URL is changed from the state in which the content is not accessible to the state in which the content is accessible, the server device 20 may transmit the message or the e-mail for notifying that the content becomes accessible or in a case where the state of the content indicated by the resource URL is changed from the state in which the content is accessible to the state in which the content is not accessible, the server device 20 may transmit the message or the e-mail for notifying that the content becomes inaccessible.

In the first embodiment described above, the file of the content may be attached to the message to be transmitted from the terminal device 10 to the server device 20. In this configuration, the server device 20 may store the content attached to the message and may store the stored URL of the content in the column of the resource URL in the notification database DB1. The server device 20 determines whether or not the URL stored in the column of the resource URL is accessible. In a case where the URL is not accessible, for example, since the content is deleted, the server device 20 may generate an e-mail having a content for notifying that the resource URL is not accessible and may transmit the generated e-mail to the mail address stored in the column of the mail address as a destination of the generated e-mail.

In the exemplary embodiment described above, the URL is included in the content, but instead of the URL, a uniform resource identifier (URI) may be included.

In a case of exchanging the e-mail, in some cases, the return mail from one e-mail may be repeated. In this case, in the second exemplary embodiment described above, the server device 20 may link an e-mail group having the same subjects exchanged by the repeated return and the URLs included these e-mails. The server device 20 determines whether or not the resource indicated by the URL is accessible. In a case where the resource is not accessible, the server device 20 may transmit the e-mail for notifying that the resource indicated by the URL is not accessible, to the sender and the receiver of the e-mail included in the e-mail group.

In the exemplary embodiment of the invention, in order to obtain the state of the resource, the server device 20 may notify that the resource is not temporally accessible, for example, in a case where there is a response of "503 Service Unavailable" to a request to the address designated by the URL. In addition, in this case, since the resource is not temporally accessible, the server device 20 may not notify that the resource is not accessible. Further, for example, in a case where there is the response of "301 Moved Permanently" to the request to the address designated by the URL, the server device 20 may notify that the address of the resource becomes another address.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:
   obtain a chat message sent by a sender to a receiver and displayed in a user interface of a chat service;
   extract resource information indicating a resource included in the content;
   link the chat message, a notification destination, and the extracted resource information;
   determine whether the resource information satisfies a predetermined condition comprising the resource information no longer being accessible,
   determine whether the chat message corresponding to the resource information has been removed in response to the predetermined condition having been satisfied,
   generate a notification as a return message corresponding to the notification destination to indicate that the resource information being not accessible in response to the predetermined condition having been satisfied and the chat message has not been removed, and
   display the notification with the chat message in the user interface.

2. The information processing apparatus according to claim 1, wherein in a case where the resource information included in the chat message is changed, the processor updates the resource information linked with the chat message to the changed resource information.

3. The information processing apparatus according to claim 2, wherein in a case where the resource information included in the chat message is changed, the processor transmits the changed resource information to the notification destination.

4. The info illation processing apparatus according to claim 2, wherein the processor transmits the notification to a notification destination designated from an outside the system as the notification destination linked with the resource information.

5. The information processing apparatus according to claim 1, wherein the processor performs the linking as the chat message is obtained.

6. The information processing apparatus according to claim 5, wherein the processor determines whether or not the resource is accessible according to the linking and in a case where the resource is not accessible, transmits the notification.

7. The information processing apparatus according to claim 1, wherein the processor sets the notification destination as a notification destination determined according to a type of the chat message.

8. The information processing apparatus according to claim 7, wherein in a case where the chat message is transmitted from a sender to a receiver, the processor sets the sender and the receiver as the notification destination.

9. The information processing apparatus according to claim 7, wherein in a case where the chat message is accessed via a communication line, the processor sets an administrator of the chat message as the notification destination.

10. The information processing apparatus according to claim 1, wherein the resource information is a uniform resource identifier or a uniform resource locator.

11. The information processing apparatus according to claim 1, wherein the processor determines whether or not the resource is accessible at a predetermined timing regardless of whether or not the resource is accessed from the notification destination; and in a case where the resource is not accessible, the processor transmits the notification to the notification destination.

12. The information processing apparatus according to claim 1, wherein the notification is displayed in a message form as a return message from the sender or the receiver to the content in the user interface.

13. A non-transitory computer readable medium storing a program causing a computer to execute a process, the process comprising:
   obtaining a chat message sent by a sender to a receiver and displayed in a user interface of a chat service;
   extracting resource information indicating a resource included in the content;
   linking the chat message, a notification destination, and the extracted resource information;
   determining whether the resource information satisfies a predetermined condition comprising the resource information no longer being accessible;
   determining whether the chat message corresponding to the resource information has been removed in response to the predetermined condition having been satisfied;
   generating a notification as a return message corresponding to the notification destination to indicate that the resource information being not accessible in response to the predetermined condition having been satisfied and the chat message has not been removed; and
   displaying the notification with the chat message in the user interface.

14. An information processing method comprising:
obtaining a chat message sent by a sender to a receiver and displayed in a user interface of a chat service;
extracting resource information indicating a resource included in the content;
linking the chat message, a notification destination, and the extracted resource information;
determining whether the resource information satisfies a predetermined condition comprising the resource information no longer being accessible;
determining whether the chat message corresponding to the resource information has been removed in response to the predetermined condition having been satisfied;
generating a notification as a return message corresponding to the notification destination to indicate that the resource information being not accessible in response to the predetermined condition having been satisfied and the chat message has not been removed; and
displaying the notification with the chat message in the user interface.

* * * * *